United States Patent [19]

Shultz

[11] 4,031,950

[45] June 28, 1977

[54] PROCESS FLUID CIRCULATION AND TEMPERATURE CONTROL SYSTEM

[75] Inventor: Gilbert F. Shultz, Novi, Mich.

[73] Assignee: Application Engineering Corporation, Elk Grove Village, Ill.

[22] Filed: Feb. 17, 1976

[21] Appl. No.: 658,350

[52] U.S. Cl. .............................. 165/31; 235/151.1; 236/15 BF; 236/17
[51] Int. Cl.² ...................................... G05D 27/00
[58] Field of Search ................. 165/30, 31; 236/17, 236/15 BF, 15 BR, 92 R, 78 A; 122/448 R; 235/151.12, 151.1

[56] References Cited

UNITED STATES PATENTS

| | | | |
|---|---|---|---|
| 3,428,250 | 2/1969 | Holthausen | 236/15 BF |
| 3,964,975 | 6/1976 | Harrison | 235/151.2 |
| 3,981,444 | 9/1976 | Weiss | 236/17 X |

*Primary Examiner*—William E. Wayner

*Attorney, Agent, or Firm*—Kinzer, Plyer, Dorn & McEachran

[57] ABSTRACT

A process liquid circulation and temperature control system including a pump for circulating water or other process liquid through a path including a heating unit, a cooling unit, and a process apparatus that is returned to the pump; the pump and the heating and cooling units are actuated in response to temperature/pressure variations sensed at the return from the process apparatus and at the delivery thereto. One pressure control measures the differential pressure across the pump and inhibits system operation except when the differential exceeds a predetermined magnitude in a given direction; another pressure control inhibits operation if the return pressure falls below a given threshold; a circuit that determines ΔP/T prevents boiling of the process fluid. For both temperature and pressure controls, the delivery and return sensors are calibrated to match each other on system start-up.

21 Claims, 9 Drawing Figures

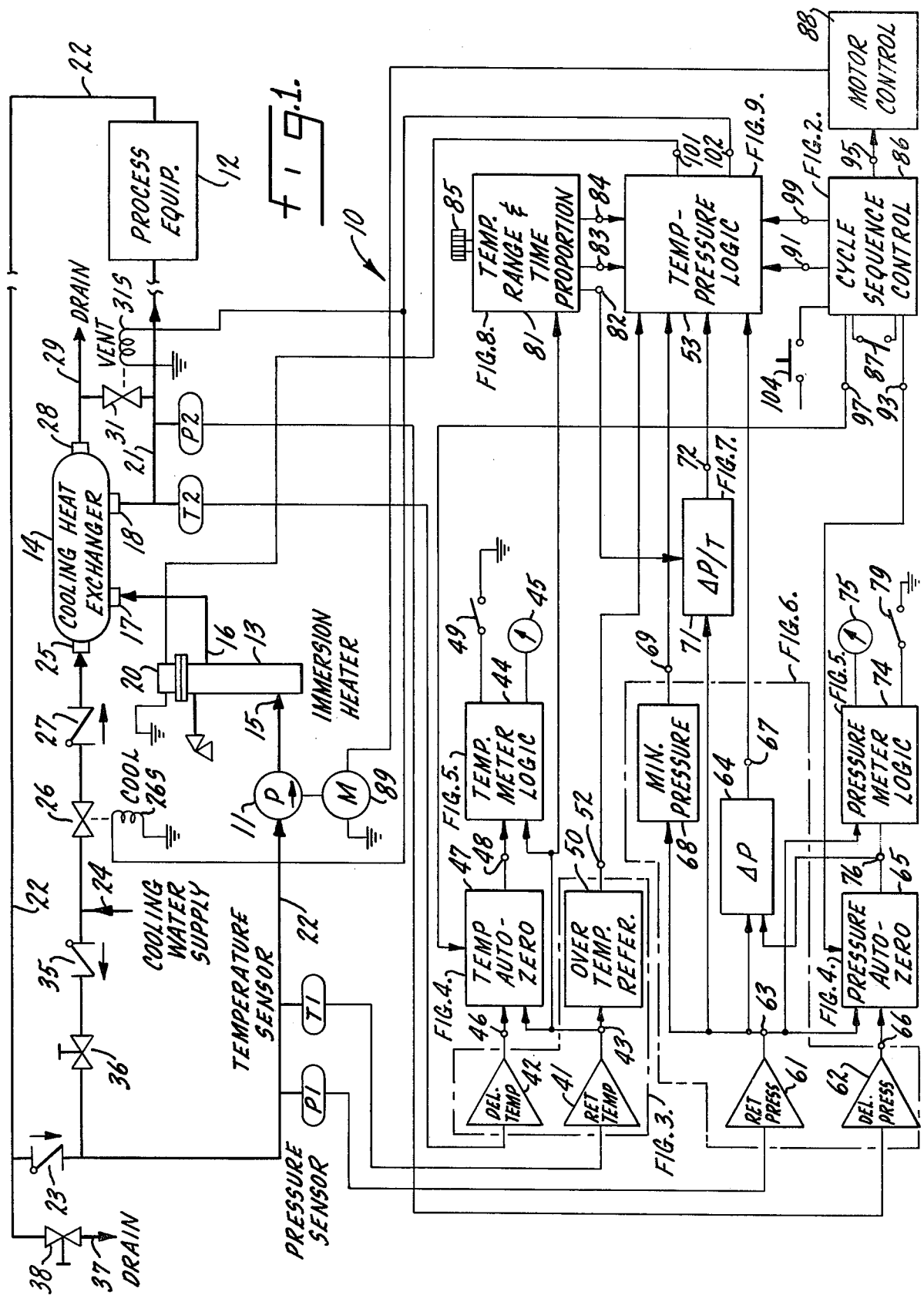

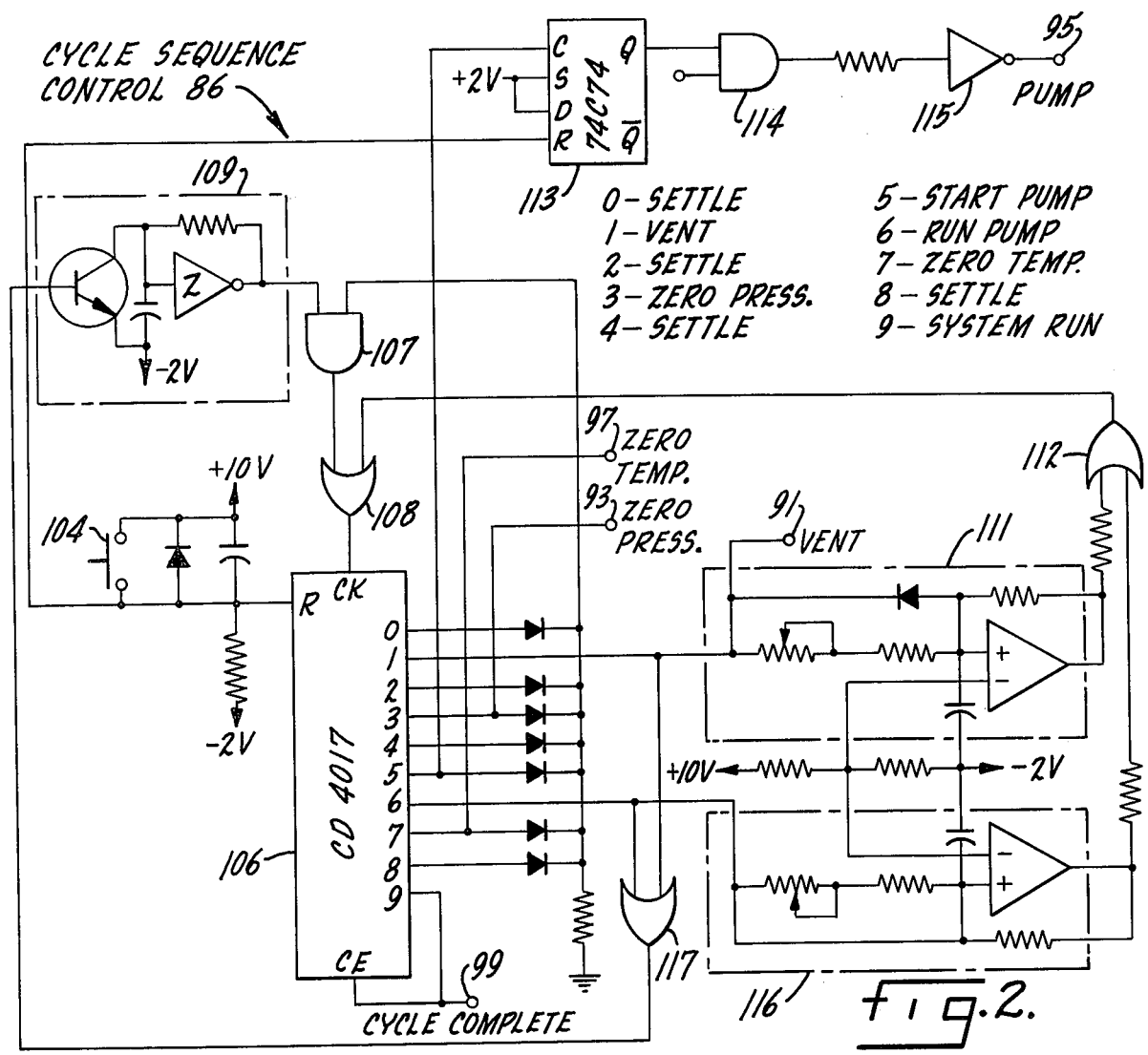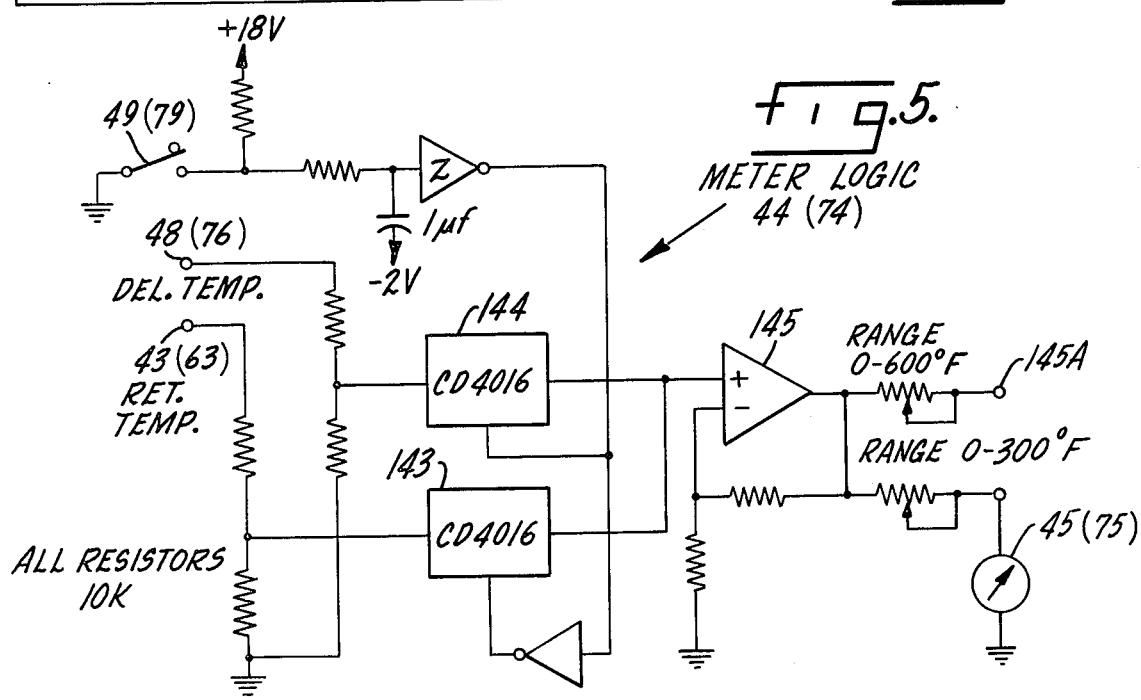

AUTO-ZERO CIRCUIT 47(65)

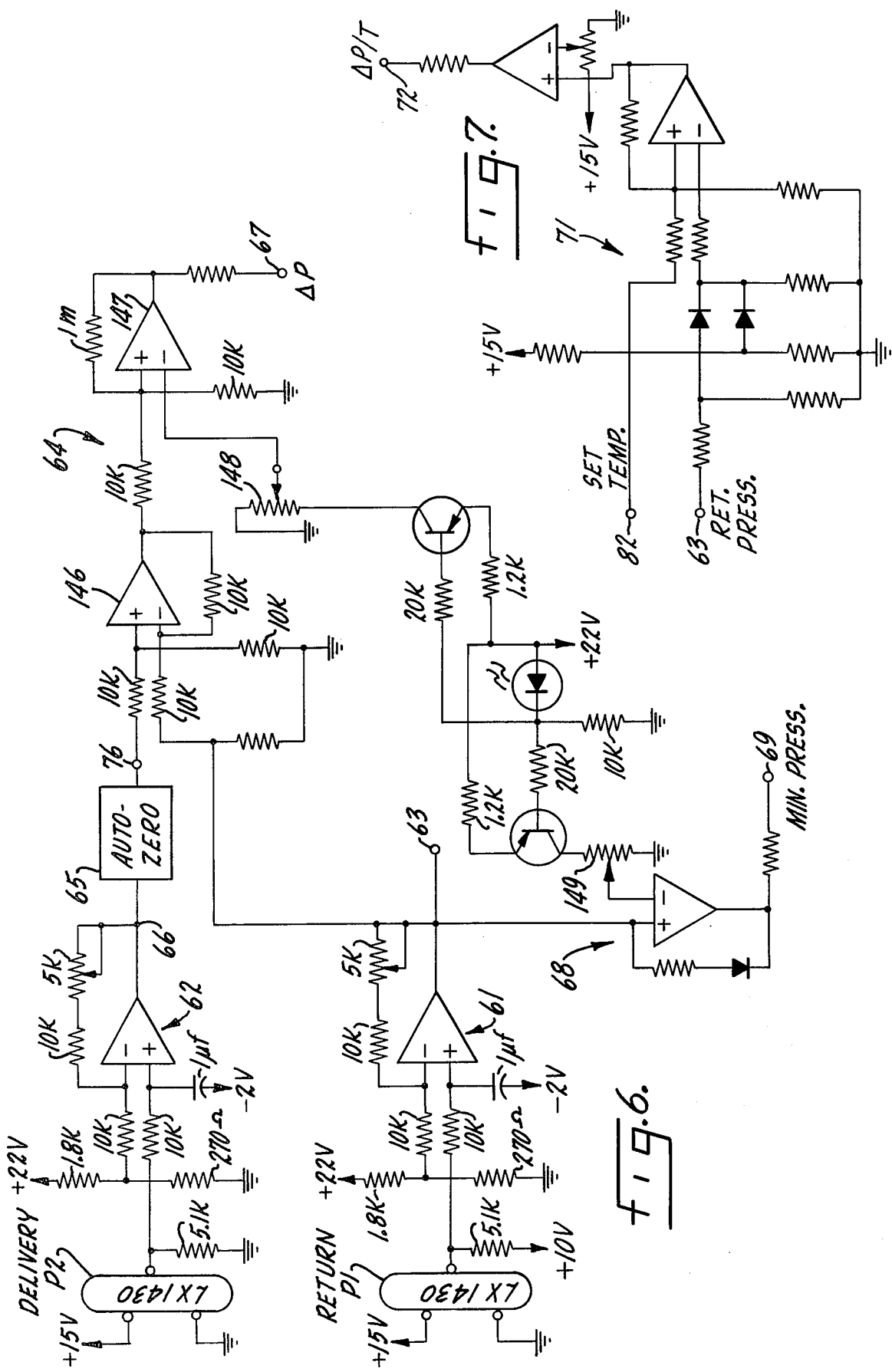

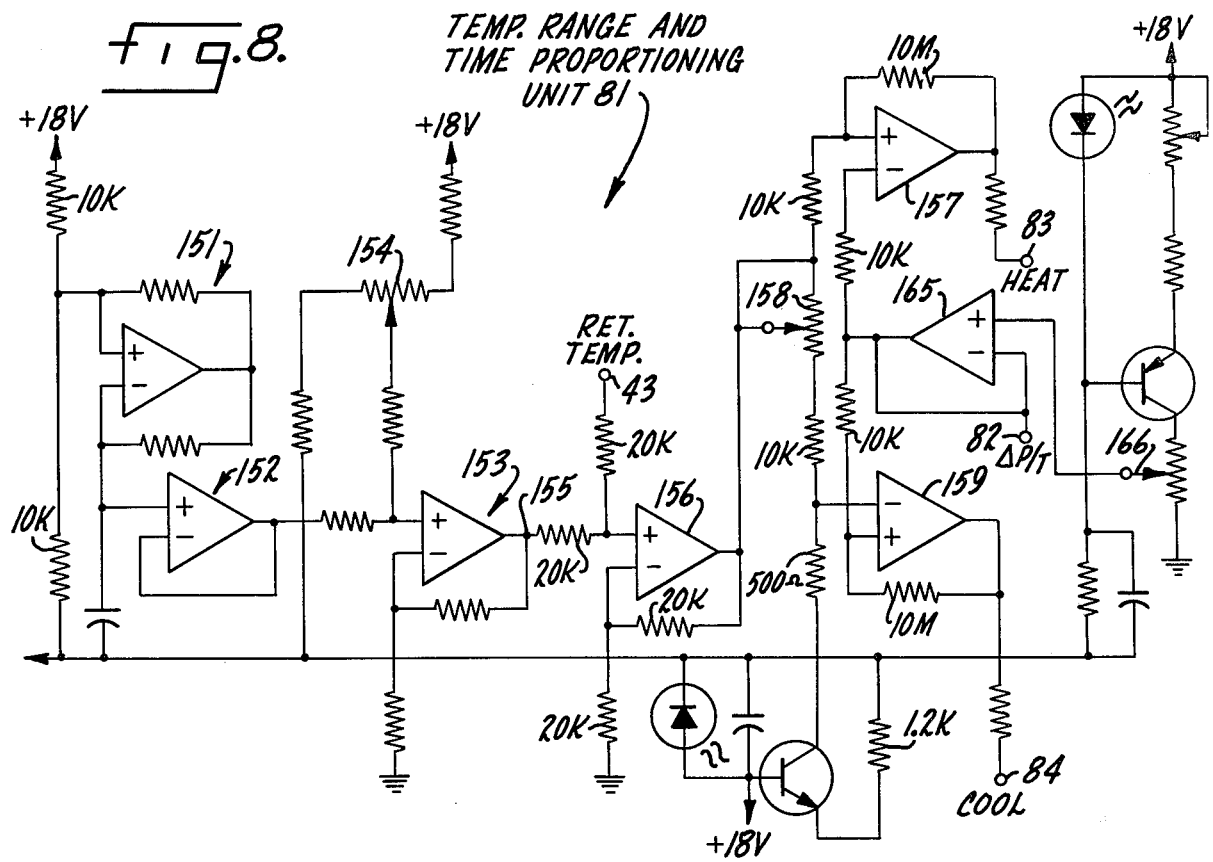
Fig. 8. TEMP. RANGE AND TIME PROPORTIONING UNIT 81
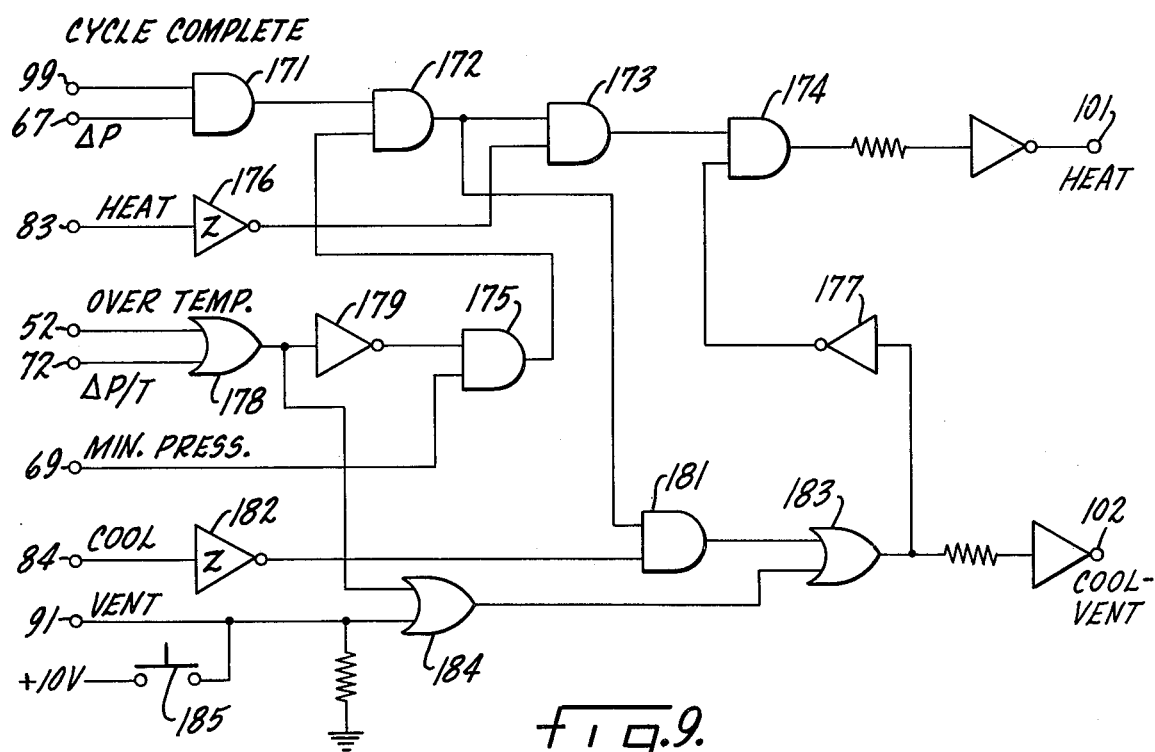
Fig. 9. TEMP./PRESS. LOGIC 53

PROCESS FLUID CIRCULATION AND TEMPERATURE CONTROL SYSTEM

BACKGROUND OF THE INVENTION

There are a number of industrial processes and like applications that require precision control of a process fluid that is pumped, under pressure, through a process apparatus. By way of example only, the molding apparatus for molding of plastic articles may require a flow of high temperature process fluid, under pressure, to maintain the molding equipment at a precise desired temperature. In some applications, usually using water as the basic process fluid, the required temperature may be of the order of 200° to 300° F., depending upon the pressure employed and other process equipment requirements. In other instances, utilizing oil or other high temperature process fluids, the required temperature may be in a range of 400° to 600° F. The pressures employed may range up to 100 pounds per square inch or even higher. For effective quality control and high production rates, the process equipment may require that the fluid temperature be held to within a range of plus or minus 1° F. or even less.

For the most part, controls used for these applications hae concentrated on precise thermal measurements and have functioned in much the same manner as ordinary thermostatic controls, sometimes with safety controls based on maintenance of minimum pressure. Systems of this general kind are frequently inadequate in the precision of the temperature control that is exercised. In addition, they do not take sufficient account of other system changes, such as the interaction between pressure and temperature conditions, to provide for precise maintenance of the necessary overall process fluid operating conditions.

In most industrial applications utilizing high-temperature high-pressure process fluids, the pumping of the fluids is effected by pumps powered by three-phase electric motors. System operation is adversely affected if the pump operates in reverse from the design direction; moreover, the thermal controls ordinarily do not work properly under reverse pumping conditions. This difficulty can be overcome by directional starting controls for the three-phase motor, but controls of this kind are usually relatively expensive. Moreover, known systems have frequently been deficient with respect to assurance of minimum circulation conditions.

SUMMARY OF THE INVENTION

It is a principal object of the present invention, therefore, to provide a new and improved electronic control for a process liquid circulation and temperature control system that provides for precise monitoring and control of pressure and thermal conditions in the system and that effectively and inherently overcomes the problems and difficulties of prior systems, including those discussed above.

A particular object of the invention is to provide a new and improved process liquid circulation and temperature control system that continuously monitors the pressure drop across the pump of the system and inhibits the operation of heat exchange apparatus included in the system except in the presence of a pressure differential of predetermined direction and amplitude.

Another object of the invention is to provide a new and improved process fluid circulation and temperature control system that continuously monitors the system which respect to conditions that may indicate incipient boiling of the process fluid and inhibits continuing system operation whenever such conditions occur.

A specific object of the invention is to provide a new and improved process fluid circulation and temperature control system that affords precise control of thermal conditions, within a range of less than plus or minus 1° F. relative to a preset temperature, but that is inexpensive to manufacture and highly reliable in operation.

Accordingly, the invention relates to a process fluid circulation and temperature control system, comprising a main heat exchange means, electrically actuatable between an active heat-exchange condition and an inactive condition, for effecting a heat exchange with a process fluid, and a pump for circulating a process fluid through the heat exchange means and through an external process apparatus that utilizes the process fluid to effect a second heat exchange. A thermal sensor senses the temperature of the process fluid at a given point on its circulation path, and temperature control circuit means, coupled to the thermal sensor and to the heat exchange means, actuates the heat exchange means between its active and inactive operating conditions in response to changes in the temperature of the process fluid. A delivery pressure sensor senses the pressure of the fluid delivered to the process apparatus to develop a delivery pressure signal, and a return pressure sensor senses the pressure of the fluid returned to the pump to develop a return pressure signal. A pressure differential control circuit means, coupled to both pressure snesors and to the temperature control circuit means, is employed to inhibit actuation of the heat exchange means to its active condition except in the presence of a differential of predetermined sign and amplitude between the delivery pressure signal and the return pressure signal.

BRIEF DESCRIPTION OF THE DRAWINGS

FIG. 1 is a schematic block diagram of a complete process fluid circulation and temperature control system constructed in accordance with the present invention;

FIGS. 2 through 9 are detailed schematic diagrams of electronic circuits that may be employed in constructing the control system of FIG. 1, as follows:

FIG. 2 Start-up sequence control

FIG. 3 Temperature input amplifiers and over-temperature reference circuit

FIG. 4 Auto-zero circuit

FIG. 5 Meter logic

FIG. 6 Pressure input amplifiers, pump pressure differential determination circuit, and minimum pressure determination circuit.

FIG. 7 Pressure/temperature ratio determination circuit

FIG. 8 Temperature setting and time proportioning control

FIG. 9 Main temperature-pressure logic

DESCRIPTION OF THE PREFERRED EMBODIMENT

Figure 3:
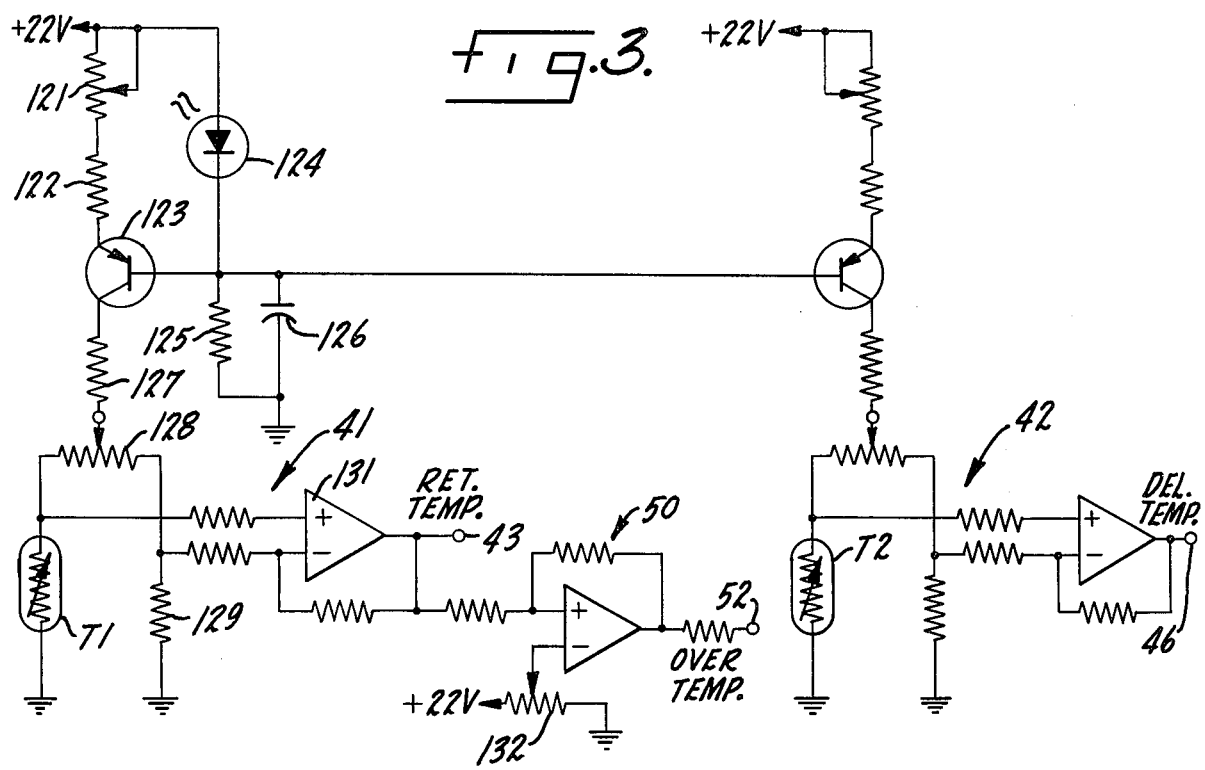

FIG. 1 affords a complete block diagram for a process fluid circulation and temperature control system 10 constructed in accordance with a preferred embodiment of the present invention. System 10 comprises a pump 11 that is employed to circulate a process liquid through the heat exchange means of the system and through an external process apparatus 12. The process fluid may be water or a mixture of water with rust-inhibiting or other additives. On the other hand, the process liquid may comprises a high temperature process fluid such as a natural oil or a synthetic heat transfer fluid (e.g., the polyalkylene glycol derivative UCON 500)

The outlet of pump 11 is connected to the inlet 15 of an immersion heater 13. The immersion heater may be of conventional construction and is electrically energized through a solenoid or other electrical control 20. The outlet 16 of heater 13 is connected to the inlet 17 of a chiller or cooling heat exchanger 14. The outlet 18 of heat exchanger 14 is connected to a delivery line 21 that extends to the inlet of the process fluid utilization apparatus 12. Typically, apparatus 12 may comprise a compression molding die, polishing rolls, an injection mold, a jacketed bath, a die casting die, or any other equipment requiring a process liquid of precisely controlled temperature and flow rate.

A process fluid return line 22 is connected from process apparatus 12 back to the inlet of pump 11, with a check valve 23 interposed in the return line. This completes the main circulation path for system 10, beginning at pump 11 and extending through the heat exchange means comprising heater 3 and chiller 14 to the delivery line 21 that leads to apparatus 12, then back through return line 22 to the pump inlet.

Heat exchanger 14 requires a flow of cooling water when in active operation. The cooling water circuit originates at a suitable cooling water supply, beginning with an inlet line 24 that is connected to a cooling water inlet 25 for chiller 14 through a solenoid-actuated cooling control valve 26 and a check valve 27. The cooling water outlet 28 of the chiller 14 is connected to a drain line 29. The process fluid delivery line 21 and the drain line 29 are interconnected by a solenoid-actuated vent valve 31.

Assuming that the process fluid comprises water, with no necessity for maintaining a constant ratio to any additives that may be employed, the cooling water supply line 18 may be utilized also as a make-up supply for the process fluid. For a system of this kind, supply line 24 is connected to the process fluid return line 22 through a check valve 35 and a shut-off valve 36. An appropriate drain 37 controlled by a manually actuated valve 38 may be provided for the process fluid circuit.

A first thermal sensor T1 is connected to the process fluid return line 22 closely adjacent pump 11. Sensor T1 may comprise an electronic sensing device that develops a signal which varies in amplitude with changes in the temperature of the process fluid that is returned to the inlet of pump 11. For example, the thermal detector T1 may comprise one of the National Semiconductor temperature transducers, type LX5600 or LX5700. In the specific circuits described hereinafter, however, a simpler sensor comprising a temperature responsive resistance device is employed (see FIG. 3). Sensor T1 is connected to an input amplifier and calibration circuit 41.

A second temperature sensor T2 is connected to the process fluid delivery line 21. Sensor T2 should be of the same type as sensor T1. Sensor T2 is connected to an input amplifier 42.

The output 43 of amplifier 41 is connected to one input of a temperature meter logic unit 44. Logic unit 44 is connected to a conventional indicating instrument 45 calibrated to afford a direct-reading indication of the process fluid temperature. The output 46 of amplifier 42 is coupled to another input of logic unit 44. However, a thermal auto-zero circuit 47 is interposed between ciruit 42 and logic unit 44. A calibration input to the thermal auto-zero circuit 47 is derived from the output 43 of amplifier 41. The temperature meter logic circuit 44 is utilized to connect either the output 48 of auto-zero circuit 47 or the output 43 of input amplifier 41 to indicator 45, an external switch 49 being provided to actuate logic circuit 44.

The output 43 of the return temperature input amplifier 41 is also connected to the input of an overtemperature reference circuit 50 having its output 52 in turn coupled to one input of a temperature-pressure logic circuit 53. Another input to logic unit 53 is derived from the output 43 of the return temperature amplifier 41.

In system 10, a return pressure sensing device P1 is connected to the process fluid return line 22 and is employed to sense the pressure of the fluid returned to the inlet of pump 11. Sensor P1 develops a return pressure signal that is supplied to an integrating input amplifier 61 having an output terminal 63. Pressure sensor P1 is preferably an electronic pressure sensing device as, for example, National Semiconductor type LX1430.

A second pressure sensor P2 is connected to the process fluid delivery line 21 to sense the pressure of the process fluid as delivered to the process apparatus 12. The delivery pressure sensor P2 is connected to an integrating input amplifier 62 having an output terminal 66. Sensor P2 is preferably an electronic pressure sensor of the same kind as sensor P1.

The output 63 of circuit 61 which constitutes an integrated return pressure signal varying in amplitude with changes in the return pressure of the process fluid, is connected to one input of a differential amplifier circuit 64. The output 66 of integrator circuit 62 is connected to another input of circuit 64; however, a pressure auto-zero circuit 65 is interposed between the integrator 62 and the differential amplifier 64. A calibration input to the pressure auto-zero circuit 65 is derived from the output 63 of integrator 61. The output 67 of the differential pressure amplifier 64 is connected to an input for the main temperature-pressure control logic unit 53.

The output 63 of the input integrator 61 in the return pressure sensing circuit is also connected to the input of a minimum pressure detecting circuit 68. The output 69 of detector 68 is connected to an input for the control logic unit 53. Another connection from the output 63 of the return pressure amplifier 61 is made to the input of a circuit 71 that produces an output signal at terminal 72 indicative of the ratio of pressure to temperature changes ($\Delta P/T$). Terminal 72 is coupled to an additional input of the logic unit 53.

A pressure meter logic circuit 74 is included in system 10 and is connected to a pressure meter 75. There are two inputs to the pressure meter logic unit 74. One of these inputs is taen from the output 63 of integrator 61 in the return pressure sensing circuit. The other input to meter logic unit 74 is derived from the output 76 of the delivery pressure auto-zero circuit 65. An external switch 79 connected to logic unit 74 provides for actuation of the logic unit to permit reading of either return pressure or delivery pressure on indicator 75.

Control system 10 further comprises a temperature range and time proportioning control logic circuit 81 having an external temperature adjustment 85. The input to logic circuit 81 is derived from the output 43 of the return temperature input circuit 41. Circuit 81 has three outputs 82, 83 and 84. Output 82 is coupled to the ΔP/T circuit 71 to supply temperature information thereto. Outputs 83 and 84 supply upper and lower temperature limit signals, respectively, to the main temperature-pressure logic unit 53.

Control system 10 provides for a predetermined operational sequence to be followed whenever the system is placed in operation. This sequence is established by a cycle sequence control unit 86 actuated by a startup switch 87. The sequence control 86 has a pressure zero command output 93 connected to the pressure auto-zero circuit 65 and a temperature zero command output 97 connected to the temperature auto-zero circuit 47. A vent command output 91 and a cycle-complete output 99 from sequence control 86 are each coupled to the main temperature-pressure logic unit 53. A pump actuation output 95 from cycle sequence control 86 is connected to a motor controller 88 employed to actuate the motor 89 that drives pump 11.

There are two outputs 101 and 102 for the main logic unit 53. Output 101 is connected to the control 20 of heater 13. Output 102 is connected to the solenoids 26S and 31S for the cooling and vent valves 26 and 31, respectively.

In considering the operation of the process fluid circulation and temperature control system 10, it may first be assumed that all of the process fluid conduits, including delivery line 21 and return line 22, the heat exchangers 13 and 14, and the process apparatus 12, are filled with the process liquid and ready for operation. System 10 is turned on by actuation of an appropriate starting switch, as generally indicated by the switch 104 connected to the cycle sequence control 86. Although the power supply circuits are not illustrated in FIG. 1, switch 104 or additional appropriate switching means make the power circuits for immersion heater 13, cooler 14, and other components of system 10 ready for operation.

The first operational step in the start-up sequence actuated by the cycle sequence control 86 is venting of the process fluid lines. This is effected by a vent command signal from terminal 91 to logic unit 53, energizing solenoid 31S to open vent valve 31 for a brief interval. Solenoid 26S may also be energized, opening valve 26 to assure filling of the cooling fluid conduits within heat exchanger 14.

With pump 11 not yet operating, the pressure in return line 22 is the same as in delivery line 21. The cycle sequence control 86 delays energization of pump motor 89 at start-up; several preliminary cycle steps are required. At an early point in the start-up cycle, control 86 supplies a command signal, from its terminal 93, to the pressure auto-zero circuit 65. Circuit 65 compares the return line pressure signal from sensor P1 and integrator 61 with the delivery line pressure signal from sensor P2 and integrator 62. If there is a differential between these two pressure signals, the auto-zero circuit 65 calibrates itself, matching its output at terminal 76 to the output of integrator 51 at terminal 63. This calibration operation effectively eliminates any null condition differential for pressure sensors P1 and P2; because the operating characteristics of the pressure sensors are essentially the same, the auto-zero operation eliminates a major source of possible error in pressure determinations made by system 10.

After a time interval sufficient to complete calibration of circuit 65, the cycle sequence control circuit supplies an actuating signal, at terminal 95, to motor control 88, which energizes motor 89 to start pump 11. After a warm-up interval, usually less than one minute, to establish complete circulation through system 10, with heater 13 still unenergized and the flow of cooling water to chiller 14 cut off, a command signal is supplied from cycle control 86, on terminal 97, to the thermal auto-zero circuit 47. Upon receipt of ths command signal, circuit 47 calibrates itself to match its output at terminal 48 to the output at terminal 43 of amplifier 41. At this point, with neither of the heat exchange devices 13 and 14 in operation, the return process fluid temperature detected by sensor T1 should be the same as the delivery fluid temperature sensed by sensor T2. Thus, circuit 47 operates in the same manner as circuit 65 to match the thermal sensor outputs to each other for a condition at which the fluid temperatures are equal.

After a brief time interval, sufficient for calibration of circuit 47, the sequence control 86 completes is start-up cycle and supplies a cycle-complete signal to logic unit 53, via terminal 99. In response, logic unit 53 energizes heater 13 to begin heating the process fluid to a selected working temperature. Before heater 13 can be energized, however, further enabling inputs to control logic 53 are necessary, from the pressure responsive circuits 64 and 68, the overtemperature circuit 50, and the ΔP/T circuit 71.

In some instances, the inputs to the differential pressure amplifier 64 (ΔP) may be such as to indicate a higher pressure in return line 22 (sensor P1) than in delivery line 21 (sensor P2). This indicates that pump 11 is being driven in the reverse direction, a condition that may occur when motor 89 is not provided with a separate direction control. Thus, differential amplifier 64 effectively detects a start-up with pump 11 operating in the wrong direction, and can be used to actuate logic unit 53 to shut system 10 down. The system is then re-started to get pump 11 running in the proper direction, using the start-up sequence described above. This permits elimination of a three-phase direction control for motor 89, which might otherwise be required.

Whenever the output from the differential amplifier 64 is of the proper sign to indicate that pump 11 is pumping the process fluid in the desired direction, but does not exceed a preset amplitude for actuation of the heater energizing logic circuits in unit 53 it is apparent that the overall operating conditions in the circulation path for the process fluid are not what they should be. Specifically, pump 11 may be running under its normal speed, or the process apparatus 12 may be bypassing the process fluid around the working portion of the apparatus. Again, control logic 53 inhibits actuation of heater 13 to its active condition.

Circuit 68 supplies an enabling signal to logic unit 53 only when a predetermined minimum pressure is sensed by the return line sensor P1. Such a low-pressure condition in the return line again indicates that the process fluid circulation system is not functioning properly, as in the case of a substantial leak or blockage at some point in the system, or some other operating conditions preventing free return flow from process apparatus 12 to pump 11. Thus, the minimum pressure control circuit comprising sensor P1, integrator 61, amplifier 68, and the control circuits of logic unit 53 effectively inhibits actuation of heater 13 except in the presence of a return pressure signal from sensor P1 exceeding a predetermined minimum amplitude. Of course, it will be apparent that a similar minimum pressure circuit based upon the output of the delivery pressure sensor P2 can also be incorporated in system 10.

On start-up, an enabling signal from the overtemperature reference circuit to logic unit is normally available, assuming system 10 and particularly heater 13 have been out of operation for some time. Circuit 50 functions as a safety, supplying an inhibit signal to logic unit 53 to shut down heater 13 for an excessive temperature condition.

Boiling of the process fluid in system 10 represents a dangerous condition that must be prevented. Of course, the boiling temperature of the process fluid is a function of system pressure, related to the parameter ΔP/T. Circuit 71 supplies an inhibit signal to logic unit 53 to preclude further heating of the process fluid whenever the pressure/temperature relation approaches too closely to a boiling condition.

On startup, the cooling heat exchanger 14 is normally maintained out of operation, since it is required only at temperatures near the selected operating temperature for the process fluid. Logic unit 53 maintains chiller 14 in an inactive condition except in the presence of input signals indicating an excessive temperature condition requiring cooling of the process fluid. In those instances in which the desired process fluid temperature is near ambient, control of chiller 14 to preclude active operation except when the pressure differential (circuit 64) and minimum pressure (circuit 68) requirements are met may be of particular importance.

When the inputs to logic unit 53 from terminals 52, 67, 69 and 72 are enabling, indicating conditions suitable for continuing operation of system 10, continuing control is assumed by the thermal control circuits of unit 81, based upon the return temperature signal from sensor T1 in the illustrated system. The return temperature signal is supplied to the temperature range and time proportioning unit 81 from the output terminal 43 of amplifier 41, and is utilized by circuits 81 and 53 to control heater 13 and chiller 14. When the return line temperature sensed by device T1 reaches a level corresponding to the desired temperature for process apparatus 12, heater 13 is de-energized. In this respect, the system functions as a conventional thermostatic control. As in any thermal control, some overshoot frequently occurs. For precision control of the operating temperature the cooling heat exchanger 14 is employed to correct for excessive overshoot.

FIGS. 2 through 9 illustrate specific circuits that may be utilized in constructing the process fluid circulation and temperature control system 10. For the most part, the circuits shown in FIGS. 2-9 are self-explanatory. Accordingly, this description of the circuit construction and operation is kept to a minimum. The circuits of FIGS. 2-9 are exemplary only; a wide variety of different individual electronic devices and circuits may be employed to achieve the same operational results.

FIG. 2 illustrates one particular circuit arrangement that may be employed for the cycle sequence control means 86. This circuit is built around a five-stage divide-by-ten Johnson couner 106 having ten sequential decoded outputs designated 0 through 9 in the drawing; the actual pin numbering on a commercial unit would be different. Counter 106 also has a clock enable input CE, a clock input CK, and a reset input R. The counter is cleared to its zero count by a logical one at its reset input R and is advanced in count on the positive edge of a clock signal applied to the input CK, provided the input to pin CE is a logical zero. Each of the decoded outputs 0 through 9 remains high until the counter is advanced an additional count.

When a reset signal is supplied to pin R of counter 106, as by momentary closing of switch 104, pin O goes high, affording an enabling signal to an AND gate 107. This enables gate 107 to pass a first cycle of a signal from a clock oscillator 109, the clock signal being supplied to the counter input CK through AND gate 107 and an OR gate 108. This advances the count in counter 106 and produces a high or logical one output on pin 1.

The high output at pin 1 of counter 106, constitutes a vent command signal at terminal 91; this signal actuates the temperature-pressure logic unit 53 (FIGS. 1 and 9) to energize the vent solenoid 31S and open vent valve 31. Thus, on start-up of system 10, the first system operation is venting of the process fluid conduits.

The positive output signal from pin 1 of counter 106 is supplied to a time delay circuit 111. After an appropriate time delay interval, sufficient to provide for effective venting of the system through valve 31, circuit 111 supplies a positive-going input signal to the clock terminal CK of counter 106, through an OR gate 112 and gate 108. Thus, the delayed signal from timer 111 is substituted for one clock pulse in the input to counter 106, a substitution that is necessary because for this step of the counter operation there is no enabling signal to AND gate 107.

When counter 106 is advanced as thus described, the output on pin 2 goes high and supplies an enabling signal to gate 107 so that an additional clock pulse from oscillator 109 is applied to counter input CK. This advances counter 106 by one more count and produces a high output at pin 3. Pin 3 is connected to output terminal 93, affording a command signal that actuates the pressure auto-zero circuit 65 (FIGS. 1 and 4) to zero the delivery pressure signal from sensor P2 and amplifier 62 in accordance with the return pressure signal developed by sensor P1 and amplifier 61. Because only a very brief time interval is required for the zeroing operation of circuit 65, the output from pin 3 of counter 106 is also supplied as an enabling signal to AND gate 107, so that the next clock pulse from oscillator 109 is applied to counter 106 and advances the counter by one more count.

On the next count, the output from pin 4 is utilized as an enabling signal for gate 107, and counter 106 is advanced by an additional count; pin 5 of counter 106 goes high, again affording an enabling signal to gate 102. The positive-going output from pin 5 is also applied to a flip-flop circuit 113 having its Q output connected through a gate 114 and driver amplifier 115 to the output terminal 95 that is connected to motor control circuit 88 (FIG. 1). On the next cycle of counter 106, a high output signal from pin 6 is supplied to a time delay circuit 116 which, after an appreciable interval, affords a clock input to counter 106 through gates 112 and 108. During this extended interval, while counter 106 maintains a positive output on pin 6, an inhibit signal is supplied to oscillator 109 through an OR gate 117, a condition that also applies during intervals in which a positive output is available at pin 1 of the counter as described above.

When counter 106 has reached its next count, a positive output from pin 7 is applied to terminal 97 as a command signal to actuate the temperature auto-zero circuit and calibrate the delivery temperature signal from sensor T2 and amplifier 42 in accordance with the return temperature signal from sensor T1 and amplifier 41 (see FIG. 1).

The logical one output from pin 7 of counter 106 (FIG. 2) is also applied to AND gate 107 as an enabling signal so that the next cycle of oscillator 109 again supplies a clock input to the counter. This advances the counter by one count, with pin 8 going high and affording a further enabling signal to gate 107. The counter is again advanced and produces a high output on pin 9 which is applied to terminal 99, signalling the temperature-pressure logic circuit 53 that the start-up sequence has been completed and system 10 is ready for continuing operation. The same signal is supplied to the clock enable input CE of counter 106 to maintain the counter in its tenth and final operating condition until a reset signal is subsequently supplied to its input R.

FIG. 3 illustrates specific circuits that may be employed for the return pressure signal amplifier 41, the delivery pressure signal amplifier 42, and the overtemperature reference circuit 50. Amplifier 41, in the configuration illustrated in FIG. 3, comprises a potentiometer 121 and resistor 122 connected in series from a high voltage DC supply to the collector of a transistor 123. The base of transistor 123 is connected to a light-emitting diode 124 that is returned to the high voltage supply. In the illustrated circuit, the LED 124 serves as a zener diode. A capacitor 126 connected in parallel with a resistor 125 from the base of transistor 123 to ground afford a noise filter for the amplifier.

The collector of transistor 123 is connected through a resistor 127 to the tap on a potentiometer 128. One end terminal of potentiometer 128 is connected to a thermistor or other temperature-variable resistor constituting the return temperature sensor T1. The other terminal of potentiometer 128 is returned to ground through a resistor In amplifier 41, the circuit elements 121 through 127 afford a fixed amplitude current source. Potentiometer 128 provides a means for zero adjustment to balance the two inputs to an integrated circuit amplifier 131 for a given null condition, which may be any desired temperature. The output of amplifier 131 is the terminal 43, on which is developed the return pressure signal utilized in the control operations of the system. The circuit for the delivery pressure amplifier 42 is identical to amplifier 41 and hence requires no further description. Amplifier 50, on the other hand, is a simple comparator that compares the output from amplifier 41 with a reference input afforded by a potentiometer 132, producing an overtemperature signal at the output terminal 52 if the return temperature exceeds a present level established by the setting of potentiometer 132.

Figure 4:
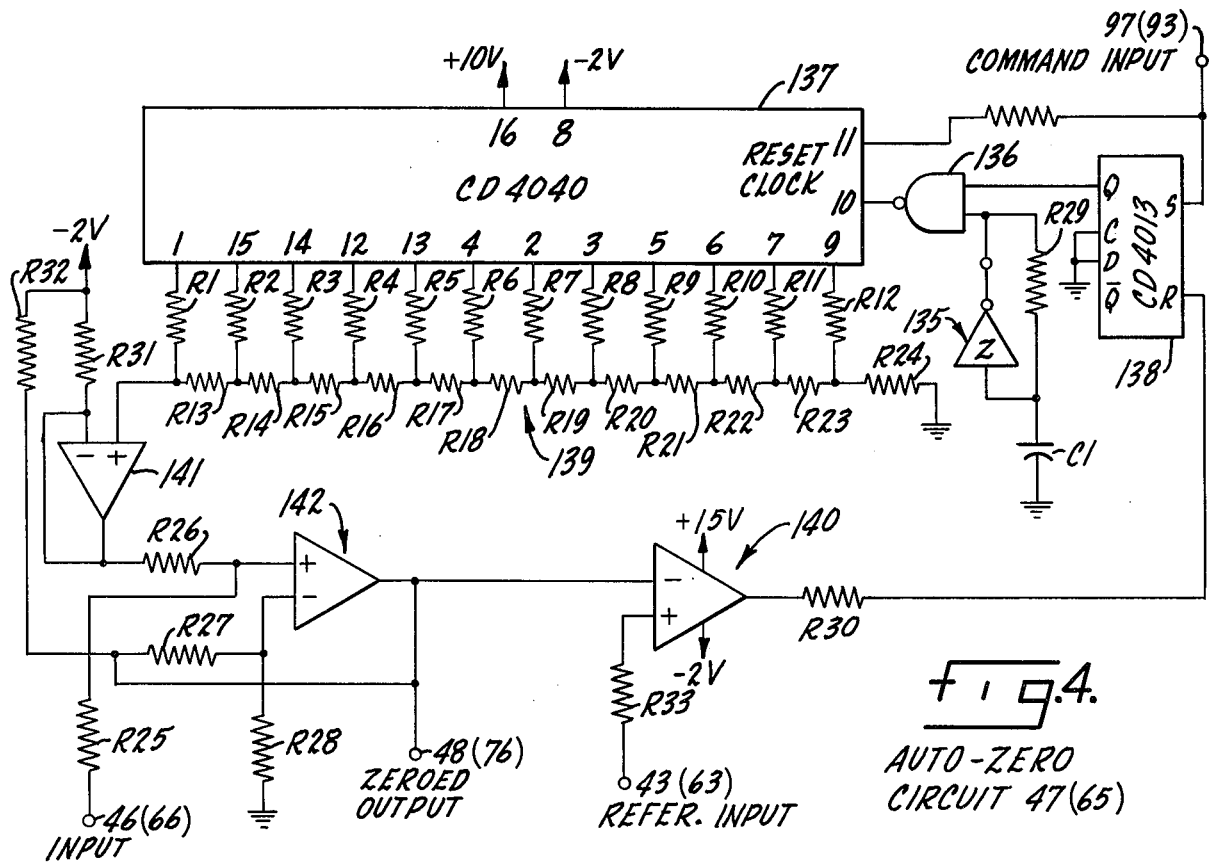

The specific temperature auto-zero-circuit 47 that is illustrated in FIG. 4 includes a simple ocillator 135 connected to one input of an inverting AND gate 136. The output of gate 136 is connected to the clock input of a twelve stage ripple-carry binary counter 137. The second input to gate 136 is derived from a flip-flop 138 having its set input connected to the command output terminal 97 of the cycle sequence control unit 86 (see FIGS. 1 and 2).

Operation of the temperature auto-zero circuit 47, using the construction illustrated in FIG. 4, is initiated by a positive-going pulse at terminal 97, which is applied to the reset input of counter 137 and to the set input of flip-flop 138. The setting of flip-flop 138 affords an enabling input to NAND gate 136, enabling the gate to supply a clock input to the counter from oscillator 135. Counter 137 is advanced one count on the negative transition of each clock pulse, completing operating circuits to the successive stages of a resistance adder circuit 139 comprising resistors R1 through R24 connected to the output pins of counter 137.

The output from circuit 139, which comprises an analog voltage having an amplitude representative of the count in counter 137, is supplied through a buffer 141 to a summing amplifier 142 together with the delivery temperature signal from terminal 46 (see FIGS. 1 and 3). The output of amplifier 142 (FIG. 4) is the calibrated or zeroed delivery temperature signal, which appears at terminal 48. This same signal is supplied to one input of a comparator amplifier 140 having a second input derived from terminal 43, this second input being the return temperature signal. When the return temperature signal from terminal 43 exceeds the modified delivery temperature input signal from terminal 48, amplifier 140 develops a reset signal that is supplied to flip-flop 138, resetting the flip-flop circuit and thus interrupting the enabling signal to gate 136. Thus, each time a command signal is supplied to terminal 97, circuit 47 automatically zeros or calibrates its delivery temperature output (terminal 48) to match the return temperature signal input supplied to circuit 47 from terminal 43.

As noted above, the pressure auto-zero circuit 65 may be identical in construction to the temperature auto-zero circuit 47. In FIG. 4, the input and output terminals for the pressure auto-zero application are shown in parentheses.

The construction for temperature meter logic circuit 44 that is illustrated in FIG. 5 is based upon two quad bi-lateral switch sections 143 and 144 that are utilized to connect either the return temperature signal from terminal 43 or the zeroed delivery temperature signal from terminal 48 to the input of an amplifier 145, the selection of the temperature signal to be supplied to amplifier 145 being controlled by switch 49. Meter 45 is connected to the output of amplifier 145. An additional output terminal 145A is provided for amplifier 143 so that the same circuit can be utilized for two different process fluids having substantially different temperature ranges (e.g., 0°–300° C. and 0°–600° C.). Amplifier 145 is employed only to restore the signal level to the meter 45 to the original input level at either of terminals 43 or 48, compensating for the losses in the input circuits to the switches 143 and 144 in the illustrated configuration. The circuit shown in FIG. 5 can also be utilized for pressure meter logic unit 74, and the appropriate terminals for the pressure meter logic are identified in FIG. 5 by the numbers appearing in parentheses.

FIG. 6 illustrates specific operating circuits that may be utilized for the return pressure signal amplifier 61, the delivery pressure signal amplifier 62, the differential pressure circuit 64, and the minimum pressure circuit 68. In the construction illustrated in FIG. 6, amplifier 61 is a conventional buffer with adjustable gain, the input to the amplifier comprising an integrating circuit connected to the pressure transducer P1. The output terminal 63 of amplifier 61 comprises one input to the comparator amplifier 68 that develops a minimum pressure signal at its output terminal 69. The other input to amplifier 68 is a reference input derived from a constant-current source including a light emitting diode utilized as a zener diode, like the circuit described more fully above in conjunction with FIG. 3. It comprises a potentiometer 149 for adjusting the reference signal input to a level representative of the lowest permissible return pressure level for the system.

The circuit for amplifier 62 that is illustrated in FIG. 6 duplicates the construction shown for amplifier 61. The output signal appearing at terminal 66 is zeroed in circuit 65, as described above, relative to the output from amplifier 61, and the resulting signal at terminal 76 is taken as one input to a differential amplifier 146 comprising a first stage of the differential pressure circuit 64. A second input to the differential amplifier 146 is derived from the output terminal 63 of the return signal amplifier 61. The output from differential amplifier 146 is supplied to a comparator amplifier 147 comprising the second stage of circuit 64 and having an adjustable reference voltage determined by the setting of a potentiometer 148 as a second input. The output terminal 67 of amplifier 147, which is the output terminal for the differential pressure circuit 64, affords a signal having a polarity which is indicative of the direction in which pump 11 (FIG. 1) is running and an amplitude indicative of the pressure drop across the pump, being the difference between the delivery pressure and the return pressure in the process fluid system.

FIG. 7 illustrates a simple ratio-determining circuit that may be utilized as the ΔP/T ratio circuit 71. One input to the ratio-determining amplifier 71 is the return pressure signal taken from terminal 63 of the return pressure amplifier 61 (see FIGS. 1 and 6). The other input, at terminal 82, is a signal representative of the preset temperature at which the process fluid system is intended to operate and is derived from the temperature range and time proportioning circuit 81, for which a specific construction is illustrated in FIG. 8. The output at terminal 72 (FIG. 7) affords an inhibiting signal that is supplied to the temperature-pressure logic unit 53 to inhibit heating in the system in any instance in which the system pressure falls low enough so that further heating of the process fluid may initiate boiling.

FIG. 8 affords an illustration of specific exemplary circuits for the temperature range and time proportioning means 81. Unit 81 includes an oscillator 151 coupled through a buffer stage 152 to one input of a summing amplifier 153. The other input to the summing amplifier 153 is a fixed voltage, which may be adjusted by means of a potentiometer 154 so that the duty cycle of the oscillator output appearing at terminal 155 can be adjusted. With the illustrated circuit, the period of oscillator 151 is approximately ten seconds, but a different frequency can be selected as desired.

The output from the time proportioning oscillator circuits 151-154, appearing at terminal 155, is supplied to an adding circuit that is also connected to the output terminal 43 of the return temperature amplifier circuit 41 (see FIGS. 1 and 3). The resulting summation signal is supplied, through a buffer amplifier 156, to one input of a heating comparator amplifier 157. The output of buffer 156 is also supplied to the tap of a deadband adjustment potentiometer 158 that is connected to one input of a cooling comparator amplifier 159. The second input to each of the comparators 157 and 159 is derived from a potentiometer 166, the adjustment of this potentiometer constituting the setting for the desired operating temperature of the process fluid in the overall system. The connection between potentiometer 166 and amplifiers 157 and 159 includes a buffer amplifier 165. The output of buffer 165 also appears at the terminal 82 that is connected to the ΔP/T circuit 71 (FIGS. 1 and 7).

The output of amplifier 157 is the heat command signal terminal 83, whereas the output of amplifier 159 is connected to the cooling command signal terminal 84. Both of the terminals 83 and 84 are connected to the main logic unit 53.

The return temperature signal, modified by the oscillation signal from the time proportioning oscillator 151-155, is applied to each of the comparators 157 and 159, with a limited difference in amplitude caused by the presence of the deadband adjustment potentiometer 158 in the input to comparator 159. In each of the comparators, the modified return temperature signal is compared with the fixed amplitude signal representative of the desired process fluid temperature as derived from potentiometer 166. When the return temperature is below the preset value, a positive heat command signal is developed by comparator 157 and appears at output terminal 83. When the return temperature exceeds the preset temperature, comparator 159 produces a positive cooling command signal at terminal 84. The limited deadband afforded by potentiometer 158 precludes excessive shifting between heating and cooling of the process fluid.

Typical logic for the main temperature/pressure logic unit 53 is shown in FIG. 9. To provide an output signal at the heat actuation terminal 101, and thereby energize heater 13 (see FIG. 1), four series-connected AND gates 171, 172, 173 and 174 must all be enabled. Gate 171 is enabled by signals from terminal 99 and 67. An enabling signal at terminal 99 indicates that the start-up cycle controlled by circuit 86 (FIGS. 1 and 2) has been completed and that system 10 is in running order. The enabling signal at terminal 67 indicates that pump 11 is running in the proper direction and that there is an adequate pressure drop across the pump.

One enabling signal to gate 172 (FIG. 9) is the output from gate 171, indicative of the conditions just described. The second input to gate 172 is taken from an AND gate 175. Gate 175 normally supplies an enabling signal to gate 172 in the presence of an enabling input from terminal 69, indicating that a minimum pressure level has been achieved in the process fluid conduits of the system, particularly in the return conduit 22.

Gate 173 receives one enabling input from the prior gate 172. A second enabling input to gate 173 is available whenever the signal from terminal 83, supplied to gate 173 through an inverting amplifier 176 indicates that the process fluid temperature is below the preset desired value. Amplifier 176 (and all others illustrated by a corresponding symbol) comprises an amplifier that develops an appreciable output in response to an input exceeding a given threshold (e.g. 6 volts) but interrupts that output only when the input falls below an appreciably lower level (e.g. 4 volts).

The final gate 174 in the chain connected to output terminal 101 receives one enabling output from the prior gate 173 and a second input from an inverter 177 that is normally an enabling input and becomes an inhibiting input only under certain conditions as described below.

Whenever the input to logic unit 53 at the over-temperature terminal 52 indictes the occurrence of an over-temperature condition, heating is precluded. Thus, an over-temperature signal appearing at terminal 52 is applied to gate 175 through an OR gate 178 and an inverter 179. This interrupts the normal enabling input to gate 175 from inverter 179, disabling gate 175 and interrupting the enabling input from that gate to gate 172. Similarly, the appearance of a ΔP/T signal at terminal 72 indicative of incipient boiling at current pressure and temperature conditions in the system serves, through operation of gates 178, 175 and 172, to preclude further heating of the process fluid.

In normal operation of the system, a cooling (and venting) actuation signal is developed at terminal 102 in response to a cooling command signal input at terminal 84. A signal at terminal 84 calling for a cooler temperature of the process fluid is supplied to an AND gate 181 through an inverting dual-threshold amplifier 182. A second input to gate 181 is derived from the output of gate 172, which indicates that the start-up cycle is complete, the pump is rotating in the right direction with a minimum drop acorss the pump, with no over-temperature condition and no ΔP/T signal indicative of incipient boiling. The output from gate 181 is supplied to terminal 102 as a cooling-venting actuation signal through an OR gate 183. The output of gate 183 is also supplied to inverter 177 to inhibit the normal enabling output from that circuit to gate 174, thereby affording positive protection against simultaneous heating and cooling actuation signals.

In the presence of either an over-temperature condition or an approach to a boiling condition, the output from OR gate 178 is applied to OR gate 183 through another OR gate 184. Thus, either of these two conditions provides for a cooling-venting actuation signal at output terminal 102 and also precludes the development of a heating actuation signal at terminal 101. A cooling and venting actuation signal is also afforded to output terminal 102 whenever a vent signal is supplied at terminal 91, from the cycle sequence control 86, as occurs in the early part of each start-up cycle as described above, the logic connection being made through the OR gates 184 and 183. A manually controlled cool and vent operation may be effected by means of a switch 185 that is also connected to gate 184.

A number of modifications can be effected in the basic process fluid circulation and temperature control system 10 while maintaining the full advantages of the invention. Thus, in the particular system described and illustrated, venting and cooling are performed simultaneously by a single actuation signal developed at the output terminal 102 of the main logic unit 53 (FIGS. 1 and 9). In some systems, it may be desirable to separate these two operations, which an be easily accomplished with minor modifications of the main logic unit 53.

In system 10, the return pressure and return temperature are taken as the critical parameters, with the delivery pressure and delivery temprature signals zeroed to the return values. In applications in which the delivery pressure and temperature are deemed more critical than the return conditions, this aspect of system 10 can be reversed merely by changing the input connections to the electronic control. Furthermore, system 10, although described for use in an application in which the process fluid is heated well above ambient to a desired temperature, can be applied to a system in which cooling of the process fluid to a preset temperature below ambient is a basic condition of system operation. In any of these applications, the system is effective to maintain close and precise control of the process fluid temperature, while protecting the system against a wide variety of operational problems and difficulties that may occur through malfunction of process apparatus 12, pump 11, or any other system component. Thus, for example, in a process fluid heating application requiring maintenance of the fluid at a temperature of about 550° F., system 10 is effective to maintain the fluid temperature within a range of less than plus or minus 1°.

As noted above, the specific logic and control circuits illustrated in FIGS. 2–9 are exemplary only and the electronic controls for system 10 can be implemented with a wide variety of different component devices. It will also be recognized that the control and logic functions afforded by the individual circuits described and illustrated can also be performed utilizing a mini-processor or even a suitably programmed general purpose computer.

I claim:

1. A process fluid circulation and temperature control system comprising:

a main heat exchange means, electrically actuatable between an active heat-exchange condition and an inactive condition, for effecting a heat exchange with a process fluid;

a pump for circulating a process fluid through the heat exchange means and through an external process apparatus that utilizes the process fluid to effect a second heat exchange;

a thermal sensor for sensing the temperature of the process fluid at a given point on its circulation path;

temperature control circuit means, coupled to the thermal sensor and to the heat exchange means, for actuating the heat exchange means between its active and inactive operating conditions in response to changes in the temperature of the process fluid;

a delivery pressure sensor for sensing the pressure of the fluid delivered to the process apparatus to develop a delivery pressure signal;

a return pressure sensor for sensing the pressure of the fluid returned to the pump to develop a return pressure signal;

and pressure differential control circuit means, coupled to both pressure sensors and to the temperature control circuit means, for inhibiting actuation of the heat exchange means to its active condition except in the presence of a differential of predetermined sign and amplitude between the delivery pressure signal and the return pressure signal.

2. A process fluid circulation and temperature control system according to claim 1, and further comprising pressure auto-zero circuit means, coupled to a first one of the pressure sensors and interposed in circuit between the second pressure sensor and the pressure differential control circuit, for calibrating the output of the second pressure sensor in accordance with the output of the first pressure sensor.

3. A process fluid circulation and temperature control system according to claim 2, in which the first pressure sensor is the return pressure sensor, and the second, calibrated pressure sensor is the delivery pressure sensor.

4. A process fluid circulation and temperature control system, according to claim 2, including cycle sequence control means for actuating the pressure auto-zero circuit means for a new calibration each time the system is placed in operation, prior to start-up of the pump or the heat exchange means.

5. A process fluid circulation and temperature control system according to claim 1, and further comprising a minimum pressure control circuit means, coupled to one of the pressure sensors and to the temperature control circuit, for inhibiting actuation of the heat exchange means to its active condition except in the presence of a pressure signal of predetermined amplitude from the one pressure sensor.

6. A process fluid circulation and temperature control system according to claim 5, in which the minimum pressure control circuit means is coupled to the return pressure sensor and inhibits actuation of the heat exchange means to its active condition except in the presence of a return pressure signal of predetermined amplitude and direction.

7. A process fluid circulation and temperature control system according to claim 5, and further comprising pressure auto-zero circuit means, coupled to the one pressure sensor and interposed in circuit between the second pressure sensor and the pressure differential control circuit, for calibrating the output of the second pressure sensor in accordance with the output of the one pressure sensor.

8. A process fluid circulation and temperature control system, according to claim 7, including cycle sequence control means for actuating the pressure auto-zero circuit means for a new calibration each time the system is placed in operation, prior to start-up of the pump or the heat exchange means.

9. A process fluid circulation and temperature control system according to claim 1, comprising two thermal sensors, one being a return thermal sensor for sensing the temperature of the fluid returned to the pump, and the other being a delivery thermal sensor for sensing the temperature of the fluid delivered to the process apparatus;
   temperature indicator means, coupled to the return and delivery thermal sensors, for displaying the return and delivery temperatures;
   and thermal auto-zero circuit means, coupled to one thermal sensor and interposed in circuit between the second thermal sensor and the temperature indicator means, for calibrating the output of the second thermal sensor in accordance with the output of the one thermal sensor.

10. A process fluid circulation and temperature control system, according to claim 9, including cycle sequence control means for actuating the thermal auto-zero circuit means for a new calibration, each time the system is placed in operation, after start-up of the pump but prior to initial actuation of the heat exchange means to active condition.

11. A process fluid circulation and temperature control system according to claim 9, and further comprising pressure auto-zero circuit means, coupled to one pressure sensor and interposed in circuit between the second pressure sensor and the pressure differential control circuit, for calibrating the output of the second pressure sensor in accordance with the output of the one pressure sensor.

12. A process fluid circulation and temperature control system according to claim 11, and further comprising cycle sequence means for actuating both auto-zero circuit means for a new calibration each time the system is placed in operation, applying a pressure calibration command signal to the pressure auto-zero circuit means prior to startup of the pump or the heat exchange means, and thereafter applying a thermal calibration command signal to the thermal auto-zero circuit means, after startup of the pump but prior to startup of the heat-exchange means.

13. A process fluid circulation and temperature control system according to claim 1, and further comprising a pressure/temperature ratio control circuit means, coupled to the thermal sensor and to one of the pressure sensors, and connected to the temperature control circuit, for inhibiting actuation of the heat exchange means to its active condition in the presence of a pressure/temperature ratio indicative of approach to a boiling condition for the process fluid.

14. A process fluid circulation and temperature control system according to claim 13, in which the pressure/temperature ratio control means is coupled to the return pressure sensor and to a temperature sensor that is connected to the return from the process apparatus to the pump.

15. A process fluid circulation and temperature control system according to claim 1, in which the temperature control circuit means includes an oscillator for actuating the heat exchange means between its active and inactive operating conditions in accordance with a predetermined duty cycle whenever the temperature of the process fluid is below a predetermined value.

16. A process fluid circulation and temperature control system according to claim 1, in which the main heat exchange means comprises a heater for heating the process fluid, the system further comprising an auxiliary heat exchange means for cooling the process fluid, the temperature control circuit means being coupled to both heat exchange means to actuate each between active and inactive operating conditions in response to variations in the process fluid temperature relative to a preset temperature level, and the pressure differential control circuit means inhibiting actuation of both heat exchange means to active condition except in the presence of a differential of predetermined sign and amplitude between the delivery pressure signal and the return pressure signal.

17. A temperature and pressure control for a process fluid circulation control system of the kind including a heat exchanger electrically actuatable between an active heat-exchange condition and an inactive condition, for effecting a heat exchange with a process fluid, and a pump for circulating a process fluid through the heat exchange means and through an external process apparatus that utilizes the process fluid to effect a second heat exchange, the control comprising:
   a thermal sensor for sensing the temperature of the process fluid at a given point on its circulation path;
   a delivery pressure sensor for sensing the pressure of the fluid delivered to the process apparatus to develop a delivery pressure signal;
   a return pressure sensor for sensing the pressure of the fluid returned to the pump to develop a return pressure signal;
   temperature control means, coupled to the thermal sensor and to the heat exchange means, for actuating the heat exchange means between its active and inactive operating conditions in response to changes in the temperature of the process fluid relative to a preset temperature;

and pressure differential control means, coupled to both pressure sensors and to the temperature control means, for inhibiting actuation of the heat exchange means to its active condition except in the presence of a differential of predetermined sign and amplitude between the delivery pressure signal and the return pressure signal.

18. A process fluid temperature and pressure control system according to claim 17, and further comprising:

minimum pressure control means, coupled to the return pressure sensor and to the temperature control means, for inhibiting actuation of the heat exchanger to its active condition except in the presence of a return pressure signal of predetermined sign and amplitude.

19. A process fluid temperature and pressure control system according to claim 18, and further comprising a pressure/temperature ratio control means, coupled to the thermal sensor and to return pressure sensor, and connected to the temperature control means, for inhibiting actuation of the heat exchanger to its active condition in the presence of a pressure/temperature ratio indicative of approach to a boiling condition for the process fluid.

20. A process fluid temperature and pressure control system according to claim 19, in which the temperature control means includes an oscillator for actuating the heat exchanger between its active and inactive operating conditions in accordance with a predetermined duty cycle whenever the temperature of the process fluid is below a predetermined value.

21. A process fluid circulation and temperature control system according to claim 20, and further comprising pressure auto-zero circuit means, coupled to the return pressure sensor and interposed in circuit between the delivery pressure sensor and the pressure differential control means, for calibrating the output of the delivery pressure sensor in accordance with the output of the return pressure sensor.

* * * * *